United States Patent
Zhou et al.

(10) Patent No.: US 10,772,130 B2
(45) Date of Patent: Sep. 8, 2020

(54) RANDOM ACCESS PROCEDURE FOR DETERMINING UPLINK TRANSMISSION CAPABILITY

(71) Applicant: HUAWEI TECHNOLOGIES CO., LTD., Shenzhen (CN)

(72) Inventors: Han Zhou, Shanghai (CN); Xiaolei Tie, Shanghai (CN); Gengshi Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/022,721

(22) Filed: Jun. 29, 2018

(65) Prior Publication Data

US 2018/0310344 A1    Oct. 25, 2018

Related U.S. Application Data

(63) Continuation of application No. PCT/CN2015/099365, filed on Dec. 29, 2015.

(51) Int. Cl.
*H04W 74/08* (2009.01)
*H04W 72/04* (2009.01)
*H04W 74/00* (2009.01)

(52) U.S. Cl.
CPC ....... *H04W 74/0833* (2013.01); *H04W 72/04* (2013.01); *H04W 74/08* (2013.01); *H04W 74/004* (2013.01); *H04W 74/006* (2013.01)

(58) Field of Classification Search
CPC . H04W 74/0833; H04W 72/04; H04W 74/08; H04W 74/006; H04W 74/004
See application file for complete search history.

(56) References Cited

U.S. PATENT DOCUMENTS 9,391,824 B2 * 7/2016 Dinan .................. H04L 5/0098
2013/0028204 A1   1/2013 Dinan et al.
(Continued)

FOREIGN PATENT DOCUMENTS

CN    101128024 A    2/2008
CN    101977401 A    2/2011
(Continued)

OTHER PUBLICATIONS

Qualcomm Incorporated: "Network Impact of CA with Small Bandwidth"; 3GPP Draft; R4-126770, vol. RAN WG4, No. New Orleans; 20121112-20121116, Nov. 5, 2012, XP050674250, 4 pages.
(Continued)

*Primary Examiner* — Ian N Moore
*Assistant Examiner* — Rushil Parimal Sampat
(74) *Attorney, Agent, or Firm* — Kilpatrick Townsend & Stockton LLP

(57) ABSTRACT

The present application discloses a random access method and apparatus. The method includes: grouping, by a network device, available random access resources into a plurality of random access resource groups; sending, by the network device, information about the plurality of random access resource groups to a terminal device; receiving, by the network device, a random access request that is sent by the terminal device based on the information about the plurality of random access resources groups; determining, by the network device, a target random access resource group to which a random access resource used for the random access request belongs; and determining, by the network device, an uplink transmission capability of the terminal device based on the target random access resource group.

9 Claims, 6 Drawing Sheets

(56) References Cited

U.S. PATENT DOCUMENTS

2014/0112254 A1* 4/2014 Lindoff .............. H04W 74/002
                                                          370/328
2015/0103761 A1   4/2015 Chen et al.
2015/0304891 A1* 10/2015 Dinan .................. H04W 76/27
                                                          370/331

FOREIGN PATENT DOCUMENTS

| CN | 101998646 A | 3/2011 |
| CN | 102088786 A | 6/2011 |
| CN | 103327613 A | 9/2013 |

OTHER PUBLICATIONS

CATT:"Consideration on RACH in CA", 3GPP Draft; R2-101058, vol. RAN WG2 No. San Francisco, Feb. 12, 2010, XP050421372, 4 pages.

\* cited by examiner

RANDOM ACCESS PROCEDURE FOR DETERMINING UPLINK TRANSMISSION CAPABILITY

CROSS-REFERENCE TO RELATED APPLICATIONS

This application is a continuation of International Application No. PCT/CN2015/099365, filed on Dec. 29, 2015, the disclosure of which is hereby incorporated by reference in its entirety.

TECHNICAL FIELD

Embodiments of the present application relate to the communications field, and more specifically, to a random access method and apparatus in the communications field.

BACKGROUND

Random access refers to a process of setting up a radio link between a terminal device and a network. The terminal device performs uplink synchronization with a network device by using random access. The network device and the terminal device can perform conventional data transmission between each other after a random access procedure is completed.

The random access procedure is mainly intended to: (1) perform uplink synchronization by the terminal device; and (2) allocate a unique identifier to the terminal device by the network device, to facilitate cell scheduling. In addition, in the random access procedure, the terminal device may request the network device to perform uplink data scheduling. Based on a data transmission type and a buffer data size that are reported by the terminal device in a random access request, the network device may schedule an appropriate time-frequency resource for the terminal device to send uplink data.

In the existing random access procedure, the network device allocates an uplink resource to the terminal device based on a default status when an uplink transmission capability of the terminal device is not considered. Default resource allocation is relatively conservative and has low transmission efficiency. If the uplink transmission capability of the terminal device is considered, the terminal device needs to report the uplink transmission capability of the terminal device to the network device for uplink resource allocation. This requires corresponding signaling overheads and is time-consuming, thereby affecting user experience.

SUMMARY

In view of this, embodiments of the present application provide a random access method and apparatus, so as to resolve a problem of large signaling overheads caused when a terminal device needs to report an uplink transmission capability of the terminal device to a network device in a random access procedure.

According to a first aspect, a random access method is provided, including:

grouping, by a network device, available random access resources into a plurality of random access resource groups, where the plurality of random access resource groups are corresponding to different uplink transmission capabilities, the uplink transmission capability includes at least one of a carrier support capability and an uplink subcarrier transmission bandwidth, and the carrier support capability is used to indicate whether multi-carrier transmission is supported;

sending, by the network device, information about the plurality of random access resource groups to a terminal device;

receiving, by the network device, a random access request that is sent by the terminal device based on the information about the plurality of random access resources groups, where the random access request is used to request to access the network device;

determining, by the network device, a target random access resource group to which a random access resource used for the random access request belongs, where the plurality of random access resource groups include the target random access resource group; and determining, by the network device, an uplink transmission capability of the terminal device based on the target random access resource group.

According to the random access method in this embodiment of the present application, the network device groups the available random access resources into the plurality of random access resource groups based on the different uplink transmission capabilities, and sends the information about the plurality of random access resource groups to the terminal device. In this way, the network device can know the uplink transmission capability of the terminal device based on the random access resource used for sending the random access request by the terminal device, so that the terminal device does not need to report the uplink transmission capability of the terminal device especially. This reduces signaling overheads and improves user experience.

According to the first aspect, optionally, the network device groups the available random access resources into N random access resource groups based on a plurality of uplink transmission capabilities. Optionally, the N random access resource groups may be in one-to-one correspondence with different uplink transmission capabilities. That is, the N random access resource groups are in one-to-one correspondence with N uplink transmission capabilities. Alternatively, the N random access resource groups may be in one-to-many correspondence with different uplink transmission capabilities. That is, one uplink transmission capability may be corresponding to a plurality of random access resource groups.

Optionally, there are at least a first random access resource group and a second random access resource group in the N random access resource groups. The first random access resource group and the second random access resource group are corresponding to different uplink transmission capabilities.

In a first possible implementation of the first aspect, the sending, by the network device, information about the plurality of random access resource groups to a terminal device includes:

broadcasting, by the network device in a broadcast message, the information about the plurality of random access resource groups. In this case, the network device sends the information about the plurality of random access resource groups to the terminal device in a broadcasting manner.

With reference to the foregoing possible implementation of the first aspect, in a second possible implementation of the first aspect, that the plurality of random access resource groups are corresponding to different uplink transmission capabilities includes:

the plurality of random access resource groups are in one-to-one correspondence with a plurality of combinations, and each of the plurality of combinations includes the uplink transmission capability and a coverage level.

In this case, the network device groups the available random access resources into the plurality of random access resource groups based on a plurality of uplink transmission capabilities and a plurality of coverage levels. Any two of the plurality of random access resource groups may be corresponding to a same uplink transmission capability and different coverage levels, or corresponding to different uplink transmission capabilities and a same coverage level, or corresponding to different uplink transmission capabilities and different coverage levels.

With reference to the foregoing possible implementation of the first aspect, in a third possible implementation of the first aspect, after the determining, by the network device based on the target random access resource group, an uplink transmission capability of the terminal device that matches the target random access resource group, the method further includes:

performing, by the network device, scheduling for the terminal device based on the uplink transmission capability of the terminal device.

In this way, the network device can determine, based on the uplink transmission capability of the terminal device, a transmission manner of transmitting uplink data, to perform scheduling for the terminal device. This improves system transmission efficiency and enhances user experience.

With reference to the foregoing possible implementation of the first aspect, in a fourth possible implementation of the first aspect, the performing, by the network device, scheduling for the terminal device based on the uplink transmission capability of the terminal device includes:

performing, by the network device, scheduling for the terminal device based on the uplink transmission capability of the terminal device and a current uplink resource usage status.

With reference to the foregoing possible implementation of the first aspect, in a fifth possible implementation of the first aspect, the performing, by the network device, scheduling for the terminal device based on the uplink transmission capability of the terminal device and a current uplink resource usage status includes:

when a current uplink resource of the network device is insufficient for the terminal device to use multi-carrier transmission and the uplink transmission capability of the terminal device indicates that the terminal device is capable of supporting multi-carrier transmission, sending, by the network device, scheduling information to the terminal device, where the scheduling information is used to instruct the terminal device to use single-carrier transmission.

With reference to the foregoing possible implementations of the first aspect, in a sixth possible implementation of the first aspect, the random access resource includes at least one of a random access preamble sequence, a time resource, and a frequency resource.

According to a second aspect, another random access method is provided, including:

receiving, by a terminal device, information about a plurality of random access resource groups that is sent by a network device, where the plurality of random access resource groups are corresponding to different uplink transmission capabilities, the uplink transmission capability includes at least one of a carrier support capability and an uplink subcarrier transmission bandwidth, and the carrier support capability is used to indicate whether multi-carrier transmission is supported;

determining, by the terminal device, from the plurality of random access resource groups, based on an uplink transmission capability of the terminal device and the information about the plurality of random access resource groups, a target random access resource group that matches the uplink transmission capability of the terminal device; and sending, by the terminal device, a random access request to the network device by using a random access resource in the target random access resource group, where the random access request is used to request to access the network device, and the target random access resource group corresponding to the random access resource can be used to indicate the uplink transmission capability of the terminal device.

In a first possible implementation of the second aspect, the receiving, by a terminal device, information about a plurality of random access resource groups that is sent by a network device includes:

obtaining, by the terminal device from a broadcast message, the information about the plurality of random access resource groups that is broadcast by the network device.

With reference to the foregoing possible implementation of the second aspect, in a second possible implementation of the second aspect, the determining, by the terminal device from the plurality of random access resource groups, a target random access resource group based on an uplink transmission capability of the terminal device and the information about the plurality of random access resource groups includes:

determining, by the terminal device from the plurality of random access resource groups, the target random access resource group based on the uplink transmission capability and a coverage level that are of the terminal device and the information about the plurality of random access resource groups.

With reference to the foregoing possible implementation of the second aspect, in a third possible implementation of the second aspect, the method further includes:

when a current uplink resource of the network device is insufficient for the terminal device to use multi-carrier transmission and the uplink transmission capability of the terminal device indicates that the terminal device is capable of supporting multi-carrier transmission, receiving, by the terminal device, scheduling information sent by the network device, where the scheduling information is used to instruct the terminal device to use single-carrier transmission.

With reference to the foregoing possible implementations of the second aspect, in a fourth possible implementation of the second aspect, the random access resource includes at least one of a random access preamble sequence, a time resource, and a frequency resource.

According to a third aspect, a random access apparatus is provided, and is configured to execute the method according to any one of the first aspect or the possible implementations of the first aspect. Specifically, the apparatus includes units configured to execute the method according to any one of the first aspect or the possible implementations of the first aspect.

According to a fourth aspect, a random access apparatus is provided, and is configured to execute the method according to any one of the second aspect or the possible implementations of the second aspect. Specifically, the apparatus includes units configured to execute the method according to any one of the second aspect or the possible implementations of the second aspect.

According to a fifth aspect, a random access apparatus is provided. The apparatus includes a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution enables the processor to execute the method according to any one of the first aspect or the possible implementations of the first aspect.

According to a sixth aspect, a random access apparatus is provided. The apparatus includes a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. When the processor executes the instruction stored in the memory, the execution enables the processor to execute the method according to any one of the second aspect or the possible implementations of the second aspect.

According to a seventh aspect, a computer readable medium is provided, and is configured to store a computer program. The computer program includes an instruction used to execute the method according to any one of the first aspect or the possible implementations of the first aspect.

According to an eighth aspect, a computer readable medium is provided, and is configured to store a computer program. The computer program includes an instruction used to execute the method according to any one of the second aspect or the possible implementations of the second aspect.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

The technical solutions of the embodiments of the present application may be applied to various communications systems, such as a Global System for Mobile Communications (Global System for Mobile Communications, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short) system, a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system, and a future 5G system.

Figure 1:
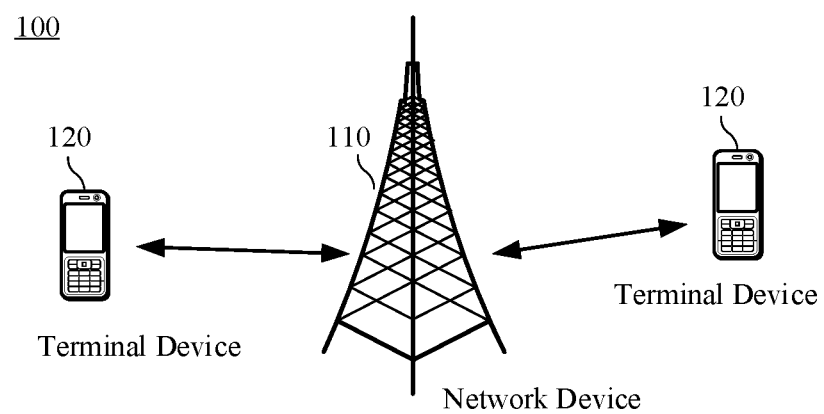
FIG. 1 is a schematic diagram of a communications system applied to an embodiment of the present application.

FIG. 1 shows a communications system 100 applied to an embodiment of the present application. The communications system 100 may include at least one network device 110. The network device 110 may be a device that bidirectionally communicates with a terminal device, for example, a base station or a base station controller. Each network device 110 may provide communication coverage to a particular geographical area, and may bidirectionally communicate with a terminal device (for example, UE) located in this coverage area (a cell). The network device 110 may be a base transceiver station (Base Transceiver Station, "BTS" for short) in a GSM system or a Code Division Multiple Access (Code Division Multiple Access, "CDMA" for short) system, a NodeB (NodeB, "NB" for short) in a WCDMA system, an evolved NodeB (Evolved Node B, "eNB" or "eNodeB" for short) in an LTE system, or an access controller in a cloud radio access network (Cloud Radio Access Network, "CRAM" for short). Alternatively, the network device may be a relay node, an access point, an in-vehicle device, a wearable device, a network side device in a future 5G network, a network device in a future evolved public land mobile network (Public Land Mobile Network, "PLMN" for short), or the like.

In this embodiment of the present application, the communications system 100 may be a Cellular Internet of Things (Cellular IoT, "CIoT" for short). A CIoT system is an important machine type communication (Machine Type Communication, "MTC" for short) communications system based on an existing cellular network infrastructure. The main service scope of future Internet of Things communication may include smart metering, medical detection and monitoring, logistics detection, industrial detection and monitoring, vehicle networking, smart communities, wearable device communication, and the like. The Internet of Things industry developed based on MTC communication is considered as the fourth wave of the information industry following the computer, the Internet, and the mobile communications network, and is a future network development direction. In addition, the CIoT system imposes requirements of large coverage, a large quantity of connections, low costs, and low power consumption on a network and a terminal device.

The wireless communications system 100 further includes a plurality of terminal devices 120 located in a coverage area of the network device 110. The terminal device 120 may be mobile or fixed. The terminal device 120 may be an access terminal, user equipment (User Equipment, "UE" for short), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device having a wireless communication function, a computing device, another processing device connected to a wireless modem, an in-vehicle device, a wearable device, a terminal device in a future 5G network, a terminal device in a future evolved public land mobile network (Public Land Mobile Network, "PLMN" for short), or the like.

FIG. 1 shows an example in which there is one network device and two terminal devices. Optionally, the communications system 100 may include a plurality of network devices, and another quantity of terminal devices may be included within a coverage area of each network device. This is not limited in this embodiment of the present application.

Optionally, the wireless communications system 100 may further include another network entity, such as a network controller or a mobility management entity. This is not limited in this embodiment of the present application.

Before the terminal device transmits uplink data to the network device, the terminal device needs to set up a connection to a cell by using a random access procedure (Random Access Procedure) and perform uplink synchronization. The terminal device can transmit the uplink data only after performing uplink synchronization. The random access procedure is mainly intended to: (1) perform uplink synchronization by the terminal device; and (2) allocate a unique identifier to the terminal device by the network device, to facilitate cell scheduling. In addition, in the random access procedure, the terminal device may request the network device to perform uplink data scheduling. Based on a data transmission type and a buffer data size that are reported by the terminal device in a random access request, the network device may schedule an appropriate time-frequency resource for the terminal device to send data. A procedure of randomly accessing the network device by the terminal device is described in the embodiments of the present application.

Figure 2:
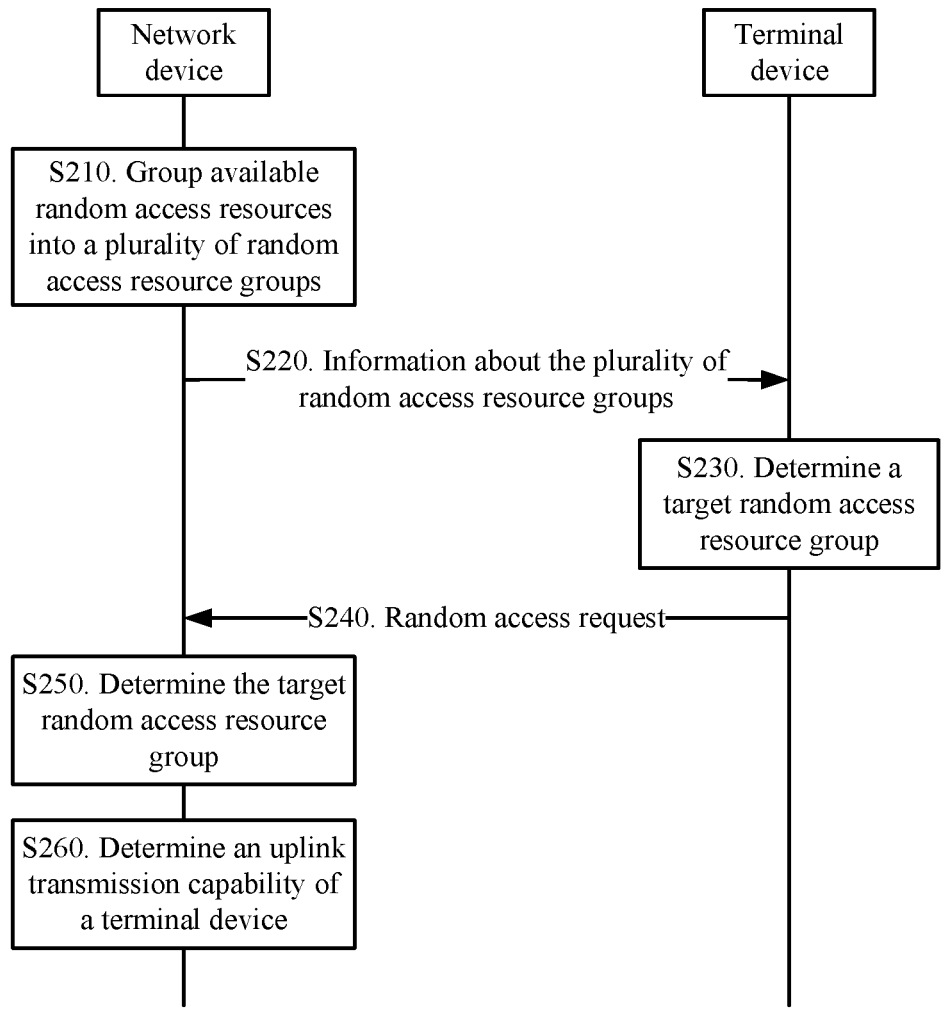
FIG. 2 is a schematic flowchart of a random access method according to an embodiment of the present application.

FIG. 2 shows a random access method 200 according to an embodiment of the present application. The method 200 may be applied to the communications system 100 shown in FIG. 1. This is not limited in this embodiment of the present application.

S210. A network device groups available random access resources into a plurality of random access resource groups, where the plurality of random access resource groups are corresponding to different uplink transmission capabilities, the uplink transmission capability includes at least one of a carrier support capability and an uplink subcarrier transmission bandwidth, and the carrier support capability is used to indicate whether multi-carrier transmission, also referred to as carrier aggregation, is supported.

In this embodiment of the present application, the uplink transmission capability may include only the carrier support capability, or may include only the uplink subcarrier transmission bandwidth, or may include both the carrier support capability and the uplink subcarrier transmission bandwidth. This is not limited in this embodiment of the present application. The carrier support capability indicates whether multi-carrier transmission is supported, and specifically, is a capability of supporting how many carriers for continuous transmission by the terminal device in a process of transmitting uplink data to the network device. The network device may group the available random access resources based on a single carrier and multiple carriers, or may group the available random access resources based on a supported quantity of carriers for simultaneous transmission, for example, one, two, or four. The uplink subcarrier transmission bandwidth indicates a transmission subcarrier bandwidth supported by the terminal device when uplink data is transmitted to the network device. Generally, the uplink subcarrier transmission bandwidth may include a broadband subcarrier and a narrowband subcarrier. The broadband subcarrier is a supported transmission subcarrier width of an LTE communications system, which is 15 kHz. The narrowband subcarrier is a subcarrier whose width is half or less than half of that of the 15 kHz subcarrier of the LTE system, for example, a subcarrier whose bandwidth is 7.5 kHz, 3.75 kHz, or 2.5 kHz.

Specifically, for example, in a typical CIoT system, that is, a narrowband IoT (Narrow band IoT, "NB-IoT" for short) system, both a minimum uplink system bandwidth and a minimum downlink system bandwidth are 200 kHz. In downlink, the system supports frequency-domain multiplexing of subcarriers whose bandwidths are 15 kHz. The network device may use a single carrier (that is, one 15 kHz carrier) to send data to the terminal device, or may use multiple carriers (that is, a plurality of continuous 15 kHz carriers) to send data to the terminal device. In uplink, the NB-IoT system supports two types of subcarriers whose bandwidths are 3.75 kHz and 15 kHz, respectively. The 3.75 kHz carrier is a narrowband subcarrier, and the 15 kHz carrier is a broadband subcarrier. When the 3.75 kHz carrier is used, the terminal device supports only single-carrier transmission. To be specific, the terminal device can send only one 3.75 kHz carrier signal at a moment. When the 15 kHz carrier is used, the terminal device may support both single-carrier transmission and multi-carrier transmission.

In uplink, the terminal device supports both subcarrier bandwidths of 3.75 kHz and 15 kHz mainly because of the following reasons. When uplink transmit power of the terminal device is limited (when the terminal device uses the same uplink transmit power), the 3.75 kHz carrier bandwidth is only ¼ of the 15 kHz carrier bandwidth and therefore a power spectrum density of the 3.75 kHz carrier for signal sending is fourfold that of the 15 kHz carrier, featuring better anti-interference and anti-path loss performance. Therefore, the 3.75 kHz carrier is more applicable to a terminal device with very poor coverage, for example, a terminal device at a cell edge or even in a basement. Moreover, the 3.75 kHz carrier bandwidth is only ¼ of the 15 kHz carrier bandwidth, and for sending a same volume of data, a required sending time of a 3.75 kHz single carrier is approximately fourfold that of a 15 kHz single carrier. Therefore, a data transmission time for a terminal device using the 3.75 kHz carrier is far greater than a data transmission time for a terminal device using the 15 kHz carrier, and power consumption of the terminal device using the 3.75 kHz carrier is also greater.

It should be understood that the different uplink transmission capabilities may be in a one-to-one relationship with or may be in a one-to-many relationship with different random access resource groups. That is, a plurality of different uplink transmission capabilities may be corresponding to a plurality of different random access resource groups, and one uplink transmission capability may be corresponding to one random access resource group, or may be corresponding to a plurality of random access resource groups. For example, one uplink transmission capability is corresponding to N random access resource groups, where N is an integer. When N is greater than or equal to 2, there are at least a first random access resource group and a second random access resource group in the N random access resource groups. The first random access resource group and the second random access resource group may be corresponding to a same uplink transmission capability, or may be corresponding to different uplink transmission capabilities. This is not limited in this embodiment of the present application.

In an optional embodiment, that the plurality of random access resource groups are corresponding to different uplink transmission capabilities includes:

the plurality of random access resource groups are in one-to-one correspondence with a plurality of combinations, and each of the plurality of combinations includes the uplink transmission capability and a coverage level.

In this embodiment of the present application, a coverage-level-based grouping manner is added. Specifically, for terminal devices located in different communication environments, scheduling policies of the network device are completely different. For example, for a terminal device located in a central location of a cell with a better radio channel condition, the network device is able to set up a reliable downlink with only relatively small power, and can use technical means such as a large transport block, higher-order modulation, and carrier binding to rapidly implement data transmission. For a terminal device at a cell edge or in a basement with relatively poor radio channel quality, the network device may require large power to maintain a link, and needs to use technologies such as a small block, lower-order modulation, repeated sending, and spread spectrum in a data transmission process to implement data transmission.

To ensure communication reliability and reduce transmit power of the network device, terminal devices with different channel conditions need to be differentiated, to facilitate scheduling of the network device. Therefore, a concept of coverage level is introduced. Terminal devices at a same coverage level have similar channel transmission conditions, the network device may use similar scheduling parameters for such terminal devices, and occupied control signaling overheads are also similar for the terminal devices. Therefore, one coverage level is corresponding to a particular channel condition or signal condition. For example, in the CIoT system, there may be three coverage levels. For a terminal device close to the network device, a coverage level is "ordinary coverage", and a quantity of repeated transmissions is 0. For a terminal device far away from the network device, a coverage level is "extended coverage", and a quantity of repeated transmissions is 8 or 16. For a terminal device in a scenario such as a basement, a coverage level is "extreme coverage", and a quantity of repeated transmissions can reach 32, 64, or more. The terminal device can choose an appropriate quantity of transmissions based on the coverage level, to reduce unnecessary repeated transmissions and power consumption.

Therefore, in this embodiment of the present application, the network device may group the available random access resources into a plurality of random access resource groups based on different uplink transmission capabilities and different coverage levels. That is, the network device may group the available random access resources based on the carrier support capability and the coverage level, or may group the available random access resources based on the uplink subcarrier transmission bandwidth and the coverage level, or may group the available random access resources based on the carrier support capability, the uplink subcarrier transmission bandwidth, and the coverage level. In addition, the network device may group the available random access resources by comprehensively considering other characteristics. This is not limited in this embodiment of the present application.

The network device groups the available random access resources into the plurality of random access resource groups based on a plurality of uplink transmission capabilities and coverage capabilities. Any two of the plurality of random access resource groups may be corresponding to a same uplink transmission capability and different coverage levels, or corresponding to different uplink transmission capabilities and a same coverage level, or corresponding to different uplink transmission capabilities and different coverage levels. The coverage level may be obtained by the terminal device by estimating a signal of the terminal device or a signal condition of the terminal device. Optionally, the coverage level may be reported by the terminal device to the network device. Alternatively, after estimating a signal of the terminal device or a signal condition of the terminal device, the terminal device reports a related estimation result to the network device, and the network device calculates a coverage level based on the result and transmits the coverage level to the terminal device.

In an optional embodiment, the random access resource includes at least one of a random access preamble sequence, a time resource used for performing random access, and a frequency resource used for performing random access. Optionally, in an LTE system, the random access preamble sequence may be a Zadoff-Chu (Zadoff-Chu, "ZC" for short) sequence obtained through cyclic shift. The ZC sequence has advantages of constant envelope, continuous phase, and good auto-correlation; therefore, the ZC sequence is usually used as a random access resource for random access. In a UMTS system or a WCDMA system, the random access preamble sequence may be obtained by scrambling a Hadamard (Hadamard) sequence. This is not limited in this embodiment of the present application.

S220. The network device sends information about the plurality of random access resource groups to a terminal device.

After grouping the available random access resources into the plurality of random access resource groups, the network device sends the information about the plurality of random access resource groups to the terminal device. It should be understood that the network device may send the information about the plurality of random access resource groups to one terminal device, or may send the information about the plurality of random access resource groups to a plurality of terminal devices. This is not limited in this embodiment of the present application.

In an optional embodiment, that the network device sends information about the plurality of random access resource groups to a terminal device includes:

the network device broadcasts, in a broadcast message, the information about the plurality of random access resource groups.

In this embodiment, the network device sends the information about the plurality of random access resource groups to the terminal device in a broadcasting manner. In this way, all terminal devices within a coverage area of the network device can obtain the information about the plurality of random access resource groups.

S230. The terminal device receives the information about the plurality of random access resource groups that is sent by the network device, and determines, from the plurality of random access resource groups, a target random access resource group based on an uplink transmission capability of the terminal device and the information about the plurality of random access resource groups.

Specifically, if the network device directly sends the information about the plurality of random access resource groups to the terminal device, the terminal device directly receives the information about the plurality of random access resource groups. If the network device broadcasts, in the broadcast message, the information about the plurality of random access resource groups, a terminal device to randomly access the network device needs to read the broadcast message and obtain the information about the plurality of random access resource groups.

After receiving the information about the plurality of random access resource groups, the terminal device may determine, from the plurality of random access resource groups, the target random access resource group based on the uplink transmission capability of the terminal device. For example, if the terminal device supports single-carrier transmission, a carrier support capability corresponding to the target random access resource group determined by the terminal device is single-carrier transmission. If the terminal device supports 15 kHz multi-carrier, a carrier support capability corresponding to the random access resource group determined by the terminal device is multi-carrier transmission, and a subcarrier transmission bandwidth corresponding to the random access resource group determined by the terminal device is 15 kHz.

In an optional embodiment, that the terminal device determines, from the plurality of random access resource groups, a target random access resource group based on an uplink transmission capability of the terminal device and the information about the plurality of random access resource groups includes:

the terminal device determines, from the plurality of random access resource groups, the target random access resource group based on the uplink transmission capability and a coverage level that are of the terminal device and the information about the plurality of random access resource groups.

Specifically, if the information about the plurality of random access resource groups is obtained by performing grouping based on different uplink transmission capabilities and different coverage levels, the terminal device may determine, from the plurality of random access resource groups, the target random access resource group based on the uplink transmission capability and the coverage level that are of the terminal device. For example, if the network device groups the available random access resources based on the carrier support capability and the coverage level, the terminal device determines the target random access resource group based on the carrier support capability and the coverage level that are of the terminal device. If the network device groups the available random access resources based on the uplink subcarrier transmission bandwidth and the coverage level, the terminal device determines the target random access resource group based on an uplink subcarrier transmission bandwidth and the coverage level that are of the terminal device. If the network device groups the available random access resources based on the carrier support capability, the uplink subcarrier transmission bandwidth, and the coverage level, the terminal device determines the target random access resource group based on a carrier support capability, the uplink subcarrier transmission bandwidth, and the coverage level that are of the terminal device.

In addition, the coverage level may be determined when the terminal device is deployed, or may be obtained by the terminal device by measuring downlink channel quality of a cell. For example, the terminal device may measure a synchronization signal of the cell, including a primary synchronization signal (Primary Synchronization Signal, "PSS" for short), a secondary synchronization signal (Secondary Synchronization Signal, "SSS" for short), a physical broadcast channel (Physical Broadcast Channel, "PBCH" for short), a cell-specific reference signal (Cell-specific reference signals, "CRS" for short), and the like. This is not limited in this embodiment of the present application. The terminal device may obtain a current coverage level of the terminal device through measurement, and selects, from the plurality of random access resource groups, a target random access resource group corresponding to the coverage level of the terminal device.

S240. The terminal device sends a random access request to the network device by using a random access resource in the target random access resource group, where the random access request is used to request to access the network device.

Specifically, after determining the target random access resource group, the terminal device may send the random access request to the network device by using the random access resource in the target random access resource group, to request to access the network device.

S250. The network device receives the random access request sent by the terminal device, and determines the target random access resource group to which the random access resource used for the random access request belongs, where the plurality of random access resource groups include the target random access resource group.

S260. The network device determines an uplink transmission capability of the terminal device based on the target random access resource group.

In an existing random access procedure, a network device allocates an uplink resource to a terminal device based on a default status when a capability of the terminal device is not considered. Default resource allocation is relatively conservative and has low transmission efficiency. If the capability of the terminal device is considered, the terminal device needs to report the capability of the terminal device to the network device for uplink resource allocation. This requires corresponding signaling overheads and is time-consuming, thereby affecting user experience.

However, according to the random access method in this embodiment of the present application, the network device groups the available random access resources into the plurality of random access resource groups based on different carrier support capabilities, and sends the plurality of random access resource groups to the terminal device; the terminal device determines, from the plurality of random access resource groups, the target random access resource group based on the carrier support capability of the terminal device, and sends the random access request to the network device by using the random access resource in the target random access resource group. This resolves a problem of large signaling overheads caused when the terminal device needs to report a capability of the terminal device to the network device in the random access procedure. In this way, the network device can know the capability of the terminal device based on the random access resource used for sending the random access request by the terminal device, so that the terminal device does not need to report the uplink transmission capability of the terminal device especially. This reduces signaling overheads and improves user experience.

In an optional embodiment, after the network device determines an uplink transmission capability of the terminal device based on the target random access resource group, the method further includes:

performing, by the network device, scheduling for the terminal device based on the uplink transmission capability of the terminal device.

Specifically, the network device may receive the random access request sent by the terminal device, and may determine, based on the random access request, the target random access resource group to which the random access resource belongs. The network device may determine the uplink transmission capability of the terminal device based on the target random access resource group. Then, the network device performs scheduling for the terminal device based on the uplink transmission capability of the terminal device. The scheduling includes actions such as resource allocation or control on the terminal device.

It should be understood that if the information about the plurality of random access resource groups is obtained by the network device by performing grouping based on different uplink transmission capabilities, the target random access resource group may be determined by the terminal device based on the uplink transmission capability of the terminal device. If the information about the plurality of random access resource groups is obtained by the network device by performing grouping based on different uplink transmission capabilities and different coverage levels, the target random access resource group may be determined by the terminal device based on the uplink transmission capability and the coverage level that are of the terminal device. In this embodiment of the present application, the network device may determine the uplink transmission capability of the terminal device based on the target random access resource group, and then performs scheduling for the terminal device based on the uplink transmission capability of the terminal device. The network device may alternatively determine the uplink transmission capability and the coverage level that are of the terminal device based on the target random access resource group, and then performs scheduling for the terminal device based on the uplink transmission capability and the coverage level that are of the terminal device. This is not limited in this embodiment of the present application.

In an optional embodiment, the performing, by the network device, scheduling for the terminal device based on the uplink transmission capability of the terminal device includes:

performing, by the network device, scheduling for the terminal device based on the uplink transmission capability of the terminal device and a current uplink resource usage status.

In this embodiment of the present application, the network device may perform scheduling for the terminal device based on the uplink transmission capability of the terminal device and the current uplink resource usage status. Specifically, the carrier support capability of the terminal device may not match the current resource usage status. For example, if a large quantity of terminal devices in a cell perform uplink data transmission currently, and available uplink resources are insufficient to satisfy the carrier support capability of the terminal device, the network device may perform scheduling for the terminal device based on the current resource usage status. For example, when the random access request indicates that the terminal device supports 15 kHz uplink multi-carrier transmission, and the network device finds that available uplink resources of a cell are insufficient to schedule a plurality of carriers for uplink transmission of the terminal device, the network device may schedule the terminal device to perform 15 kHz single-carrier transmission, or even schedule the terminal device to perform 3.75 kHz single-carrier transmission. However, if the carrier support capability of the terminal device indicates that the only single-carrier transmission is supported, the network device should not schedule the terminal device to perform multi-carrier transmission.

It should be understood that the foregoing current uplink resource may include at least one of a time resource, a frequency resource, and an orthogonal code division resource. This is not limited in this embodiment of the present application.

In an optional embodiment, the performing, by the network device, scheduling for the terminal device based on the uplink transmission capability of the terminal device and a current uplink resource usage status includes:

when a current uplink resource of the network device is insufficient for the terminal device to use multi-carrier transmission and the uplink transmission capability of the terminal device indicates that the terminal device is capable of supporting multi-carrier transmission, sending, by the network device, scheduling information to the terminal device, where the scheduling information is used to instruct the terminal device to use single-carrier transmission.

The terminal device receives the scheduling information.

In the NB-IoT system, two types of subcarriers whose bandwidths are 3.75 kHz and 15 kHz and two transmission modes of single-carrier transmission and multi-carrier transmission can be supported in uplink. However, in an existing method, a method for determining a subcarrier transmission bandwidth and a transmission mode in an uplink transmission process is not provided, and whether the subcarrier transmission bandwidth and the transmission mode should be determined by a network device or a terminal device is neither specified. This severely affects uplink data transmission efficiency. However, in this embodiment of the present application, a random access manner is used. The network device groups the available random access resources into the plurality of random access resource groups based on the different uplink transmission capabilities, and sends the information about the plurality of random access resource groups to the terminal device; the terminal device determines, from the information about the plurality of random access resource groups, the target random access resource group corresponding to the uplink transmission capability of the terminal device; the terminal device sends the random access request to the network device by using the random access resource in the target random access resource group. In this way, the network device can perform scheduling for the terminal device based on an actual uplink transmission capability of the terminal device, and the terminal device can perform uplink data transmission based on the uplink transmission capability of the terminal device.

Therefore, according to the random access method in this embodiment of the present application, the network device groups the available random access resources into the plurality of random access resource groups based on the different uplink transmission capabilities, and sends the plurality of random access resource groups to the terminal device; the terminal device determines, from the plurality of random access resource groups, the target random access resource group based on the uplink transmission capability of the terminal device, and sends the random access request to the network device by using the random access resource in the target random access resource group; the network device can determine the random access resource used for the random access request, so as to determine the uplink transmission capability of the terminal device, and perform scheduling for the terminal device based on the uplink transmission capability of the terminal device, so that the terminal device does not need to report the capability of the terminal device. This reduces signaling overheads, and resolves a problem that a transmission mode cannot be determined when the terminal device performs uplink transmission, so that the terminal device can transmit uplink data based on the capability of the terminal device. This improves system transmission efficiency and enhances user experience.

It should be understood that sequence numbers of the foregoing processes do not mean an execution order. The execution order of the processes should be determined based on functions and internal logic of the processes, and should not be construed as any limitation on implementation processes of this embodiment of the present application.

Figure 3:
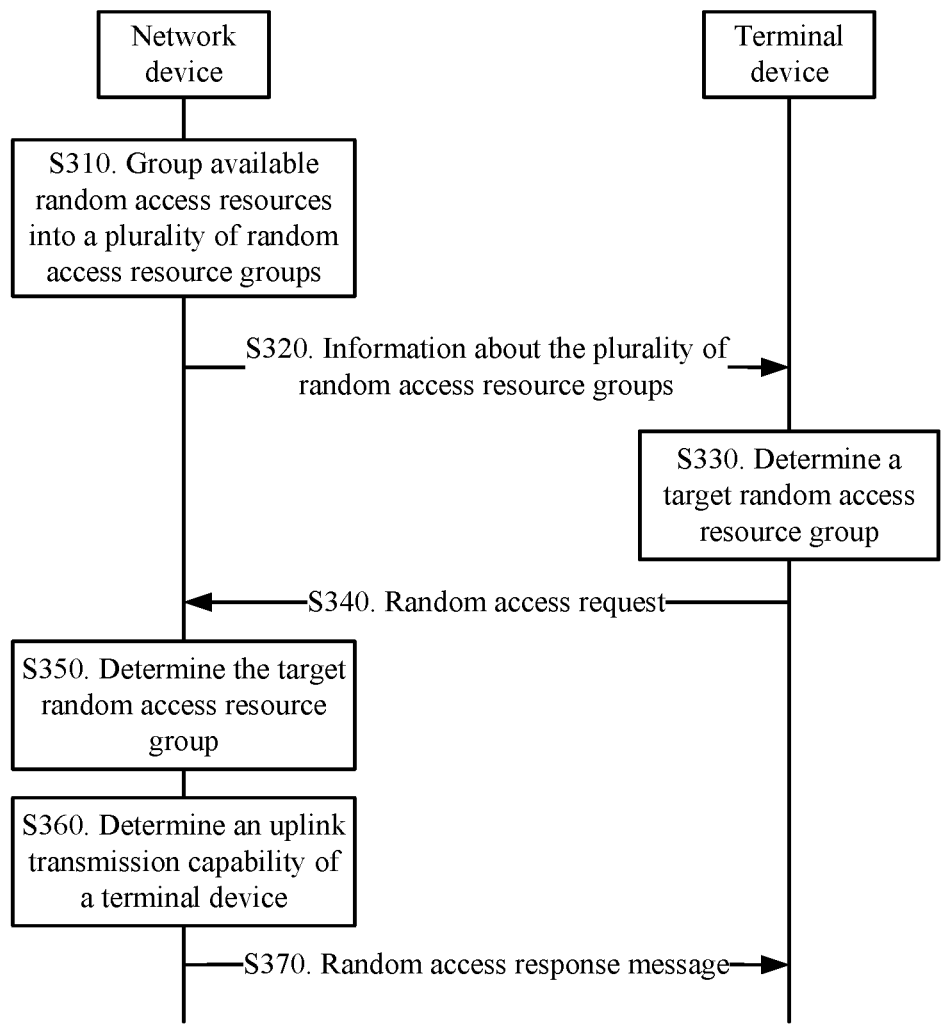
FIG. 3 is a schematic flowchart of another random access method according to an embodiment of the present application.

FIG. 3 is a schematic flowchart of a random access method 300 according to an embodiment of the present application.

In S310, a network device groups available random access resources into a plurality of random access resource groups based on a coverage level, an uplink subcarrier transmission bandwidth, and a carrier support capability. The random access resource is a ZC sequence.

Specifically, for example, if there are a total of 251 available random access resources (which are corresponding to 251 ZC sequences whose sequence numbers are denoted by 0-250) in a cell, the available random access resources may be grouped as follows:

a. for ordinary coverage, multi-carrier, and 15 kHz subcarrier bandwidth: sequence numbers 0-30 and 211-250;

b. for ordinary coverage, single-carrier, and 15 kHz subcarrier bandwidth: sequence numbers 31-60;

c. for extended coverage, multi-carrier, and 15 kHz subcarrier bandwidth: sequence numbers 61-90;

d. for extended coverage, single-carrier, and 15 kHz subcarrier bandwidth: sequence numbers 91-120;

e. for extended coverage, single-carrier, and 3.75 kHz subcarrier bandwidth: sequence numbers 121-150;

f. for extreme coverage, single-carrier, and 15 kHz subcarrier bandwidth: sequence numbers 151-180; and g. for extreme coverage, single-carrier, and 3.75 kHz subcarrier bandwidth: sequence numbers 181-210.

Herein, the coverage level includes ordinary coverage, extended coverage, and extreme coverage; the supported subcarrier bandwidth includes 3.75 kHz and 15 kHz; the carrier support capability includes single-carrier transmission and multi-carrier transmission.

In S320, the network device broadcasts, in a broadcast message, information about the plurality of random access resource groups.

In S330, the terminal device obtains, from the broadcast message, the information about the plurality of random access resource groups, and determines, from the plurality of random access resource groups, a target random access resource group based on a coverage level, an uplink subcarrier transmission bandwidth, and a carrier support capability that are of the terminal device.

For example, if the terminal device supports only single-carrier transmission with a 3.75 kHz subcarrier spacing in uplink, and the terminal device finds through downlink measurement that a current coverage level is correspondingly extended coverage, the target random access resource group determined by the terminal device is the foregoing group e.

In S340, the terminal device sends a random access request to the network device by using a random access resource in the target random access resource group, to request to access the network device.

Specifically, for example, the terminal device randomly selects, from the group e, the sequence 130 as a current random access transmission sequence, and sends the sequence 130 on a time-frequency resource specified for random access, that is, sends a random access request carrying the sequence 130.

In S350, the network device receives the random access request and determines the target random access resource group to which the random access resource used for the random access request belongs.

In S360, the network device determines the coverage level, the uplink subcarrier transmission bandwidth, and the carrier support capability that are of the terminal device based on the target random access resource group.

Specifically, for example, the network device receives, on the time-frequency resource specified for random access, the random access request carrying the sequence 130 that is sent by the terminal device. If the network device performs correct reception and obtains the sequence 130 through decoding, the network device may determine, based on the sequence 130, the target random access resource group determined by the terminal device, and then the network device obtains a current coverage level, the supported subcarrier bandwidth, and the carrier support capability that are of the terminal device. The network device may further obtain, from the random access request, information such as a current access type and a current uplink buffer data size that are of the terminal device.

In S370, the network device sends a random access response message to the terminal device. The random access response message carries scheduling information. The scheduling information is used to perform scheduling for the terminal device based on the coverage level, the uplink subcarrier transmission bandwidth, and the carrier support capability that are of the terminal device.

Specifically, if an uplink resource is available in a cell for transmission of the terminal device in a current time period, the network device may send the random access response message to the terminal device, and the random access response message carries the scheduling information. In the foregoing example, after receiving the random access response message sent by the network device, the terminal device uses, based on the scheduling information included in the random access response message, a 3.75 kHz single carrier to transmit uplink data.

According to the random access method in this embodiment of the present application, the network device groups the available random access resources into the plurality of random access resource groups based on different uplink transmission capabilities and different coverage levels, and sends the plurality of random access resource groups to the terminal device; the terminal device determines, from the plurality of random access resource groups, the target random access resource group based on the carrier support capability and the coverage level that are of the terminal device, and sends the random access request to the network device by using the random access resource in the target random access resource group; the network device can determine the random access resource used for the random access request, so as to determine the carrier support capability and the coverage level that are of the terminal device, and perform scheduling for the terminal device based on the carrier support capability and the coverage level that are of the terminal device, so that the terminal device does not need to report the capability of the terminal device. This reduces signaling overheads, and resolves a problem that a transmission mode cannot be determined when the terminal device performs uplink transmission, so that the terminal device can transmit uplink data based on the capability of the terminal device. This improves system transmission efficiency and enhances user experience.

It should be understood that sequence numbers of the foregoing processes do not mean an execution order. The execution order of the processes should be determined based on functions and internal logic of the processes, and should not be construed as any limitation on implementation processes of this embodiment of the present application.

The foregoing describes the random access method according to the embodiment of the present application in detail with reference to FIG. 1 to FIG. 3. The following describes a random access apparatus according to an embodiment of the present application in detail with reference to FIG. 4 to FIG. 8.

Figure 4:
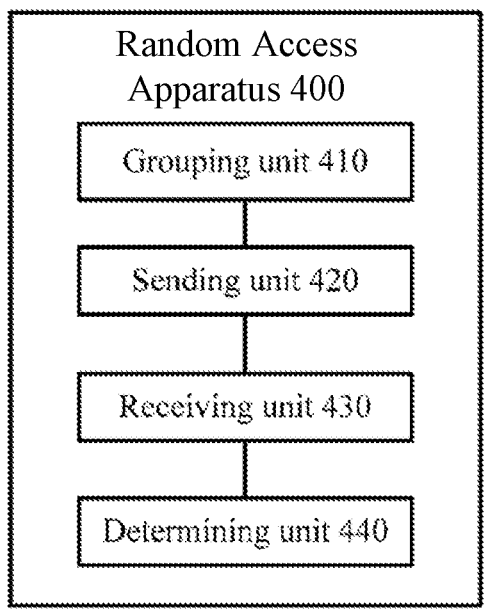
FIG. 4 is a schematic block diagram of a random access apparatus according to an embodiment of the present application.

FIG. 4 shows a random access apparatus 400 according to an embodiment of the present application. The apparatus 400 includes:

a grouping unit 410, configured to group available random access resources into a plurality of random access resource groups, where the plurality of random access resource groups are corresponding to different uplink transmission capabilities, the uplink transmission capability includes at least one of a carrier support capability and an uplink subcarrier transmission bandwidth, and the carrier support capability is used to indicate whether multi-carrier transmission is supported;

a sending unit 420, configured to send information about the plurality of random access resource groups to a terminal device;

a receiving unit 430, configured to receive a random access request that is sent by the terminal device based on the information about the plurality of random access resource groups, where the random access request is used to request to access the apparatus; and a determining unit 440, configured to determine a target random access resource group to which a random access resource used for the random access request belongs, where the plurality of random access resource groups include the target random access resource group.

The determining unit is further configured to determine, based on the target random access resource group, an uplink transmission capability of the terminal device that matches the target random access resource group.

Optionally, that the plurality of random access resource groups are corresponding to different uplink transmission capabilities includes:

the plurality of random access resource groups are in one-to-one correspondence with a plurality of combinations, and each of the plurality of combinations includes the uplink transmission capability and a coverage level.

Figure 5:
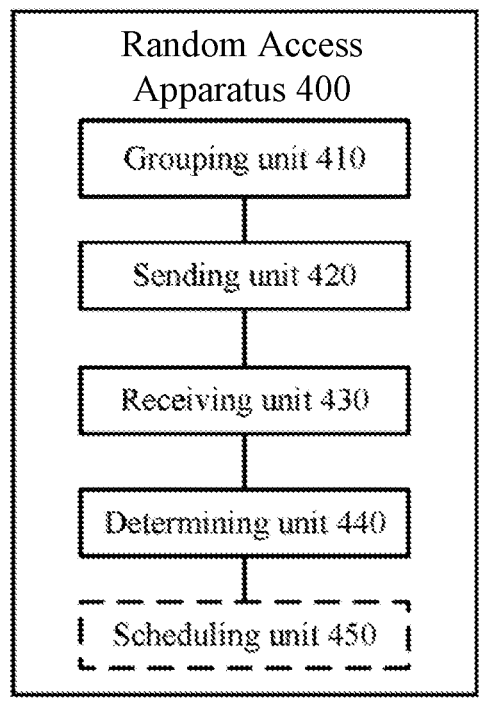
FIG. 5 is a schematic block diagram of another random access apparatus according to an embodiment of the present application.

Optionally, as shown in FIG. 5, the apparatus further includes:

a scheduling unit 450, configured to perform scheduling for the terminal device based on the uplink transmission capability of the terminal device after the uplink transmission capability of the terminal device is determined based on the target random access resource group.

Optionally, the scheduling unit is specifically configured to:

perform scheduling for the terminal device based on the uplink transmission capability of the terminal device and a current uplink resource usage status.

Optionally, the sending unit is further configured to:

when a current uplink resource of the apparatus is insufficient for the terminal device to use multi-carrier transmission and the uplink transmission capability of the terminal device indicates that the terminal device is capable of supporting multi-carrier transmission, send scheduling information to the terminal device, where the scheduling information is used to instruct the terminal device to use single-carrier transmission.

Optionally, the random access resource includes at least one of a random access preamble sequence, a time resource, and a frequency resource.

It should be understood that the apparatus 400 herein is embodied in a form of a functional unit. The term "unit" herein may be an application-specific integrated circuit (Application Specific Integrated Circuit, ASIC), an electronic circuit, a processor configured to execute one or more software or firmware programs (for example, a shared processor, a dedicated processor, or a group processor) and a memory, or a combinational logic circuit and/or another appropriate component supporting the described functions. In an optional example, a person skilled in the art may understand that the apparatus 400 may be specifically the network device in the foregoing embodiments, and the apparatus 400 may be configured to perform procedures and/or steps corresponding to the network device in the foregoing method embodiments. To avoid repetition, details are not described herein again.

Figure 6:
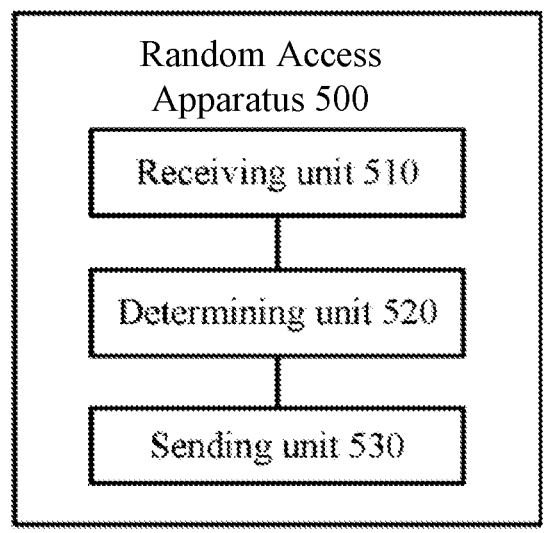
FIG. 6 is a schematic block diagram of another random access apparatus according to an embodiment of the present application.

FIG. 6 shows a random access apparatus 500 according to an embodiment of the present application. The apparatus 500 includes:

a receiving unit 510, configured to receive information about a plurality of random access resource groups that is sent by a network device, where the plurality of random access resource groups are corresponding to different uplink transmission capabilities, the uplink transmission capability includes at least one of a carrier support capability and an uplink subcarrier transmission bandwidth, and the carrier support capability is used to indicate whether multi-carrier transmission is supported;

a determining unit 520, configured to determine, from the plurality of random access resource groups, a target random access resource group based on an uplink transmission capability of the apparatus and the information about the plurality of random access resource groups; and a sending unit 530, configured to send a random access request to the network device by using a random access resource in the target random access resource group, where the random access request is used to request to access the network device.

Optionally, the plurality of random access resource groups are in one-to-one correspondence with a plurality of combinations, and each of the plurality of combinations includes the uplink transmission capability and a coverage level. The determining unit is specifically configured to:

determine, from the plurality of random access resource groups, the target random access resource group based on the uplink transmission capability and a coverage level that are of the apparatus and the information about the plurality of random access resource groups.

Optionally, the receiving unit is further configured to:

when a current uplink resource of the network device is insufficient for the apparatus to use multi-carrier transmission, and the uplink transmission capability of the apparatus indicates that the apparatus is capable of supporting multi-carrier transmission, receive scheduling information sent by the network device, where the scheduling information is used to instruct the apparatus to use single-carrier transmission.

Optionally, the random access resource includes at least one of a random access preamble sequence, a time resource, and a frequency resource.

It should be understood that the apparatus 500 herein is embodied in a form of a functional unit. The term "unit" herein may be an application-specific integrated circuit (Application Specific Integrated Circuit, ASIC), an electronic circuit, a processor configured to execute one or more software or firmware programs (for example, a shared processor, a dedicated processor, or a group processor) and a memory, or a combinational logic circuit and/or another appropriate component supporting the described functions. In an optional example, a person skilled in the art may understand that the apparatus 500 may be specifically the terminal device in the foregoing embodiments, and the apparatus 500 may be configured to perform procedures and/or steps corresponding to the terminal device in the foregoing method embodiments. To avoid repetition, details are not described herein again.

Figure 7:
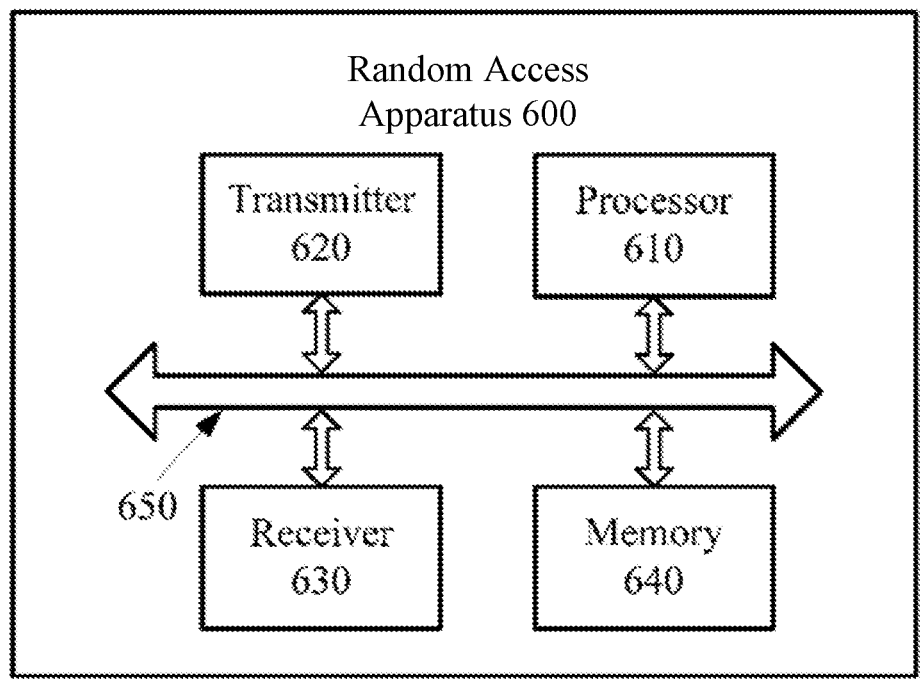
FIG. 7 is a schematic block diagram of another random access apparatus according to an embodiment of the present application.

FIG. 7 shows a random access apparatus 600 according to an embodiment of the present application. The apparatus 600 includes a processor 610, a transmitter 620, a receiver 630, a memory 640, and a bus system 650. The processor 610, the transmitter 620, the receiver 630, and the memory 640 are connected by using the bus system 650. The memory 640 is configured to store an instruction. The processor 610 is configured to execute the instruction stored in the memory 640, to control the transmitter 620 to send a signal and control the receiver 630 to receive a signal.

The processor 610 is configured to group available random access resources into a plurality of random access resource groups. The plurality of random access resource groups are corresponding to different uplink transmission capabilities. The uplink transmission capability includes at least one of a carrier support capability and an uplink subcarrier transmission bandwidth. The carrier support capability is used to indicate whether multi-carrier transmission is supported.

The transmitter 620 is configured to send information about the plurality of random access resource groups to a terminal device.

The receiver 630 is configured to receive a random access request that is sent by the terminal device based on the information about the plurality of random access resource groups. The random access request is used to request to access the apparatus.

The processor 610 is configured to determine a target random access resource group to which a random access resource used for the random access request belongs. The plurality of random access resource groups include the target random access resource group.

The processor 610 is further configured to determine an uplink transmission capability of the terminal device based on the target random access resource group.

Optionally, that the plurality of random access resource groups are corresponding to different uplink transmission capabilities includes:

the plurality of random access resource groups are in one-to-one correspondence with a plurality of combinations, and each of the plurality of combinations includes the uplink transmission capability and a coverage level.

Optionally, the transmitter 620 is further configured to perform scheduling for the terminal device based on the uplink transmission capability of the terminal device after the uplink transmission capability of the terminal device is determined based on the target random access resource group.

Optionally, the transmitter 620 is specifically configured to:

perform scheduling for the terminal device based on the uplink transmission capability of the terminal device and a current uplink resource usage status.

Optionally, the transmitter 620 is specifically configured to:

when a current uplink resource of the apparatus is insufficient for the terminal device to use multi-carrier transmission and the uplink transmission capability of the terminal device indicates that the terminal device is capable of supporting multi-carrier transmission, send scheduling information to the terminal device, where the scheduling information is used to instruct the terminal device to use single-carrier transmission.

Optionally, the random access resource includes at least one of a random access preamble sequence, a time resource, and a frequency resource.

It should be understood that the apparatus 600 may be specifically the network device in the foregoing embodiments, and may be configured to perform steps and/or procedures corresponding to the network device in the foregoing method embodiments. Optionally, the memory 640 may include a read-only memory and a random access memory, and provide an instruction and data to the processor. A part of the memory may further include a non-volatile random access memory. For example, the memory may further store device type information. The processor 610 may be configured to execute the instruction stored in the memory. When the processor executes the instruction stored in the memory, the processor is configured to perform the steps and/or the procedures in the foregoing method embodiments.

Figure 8:
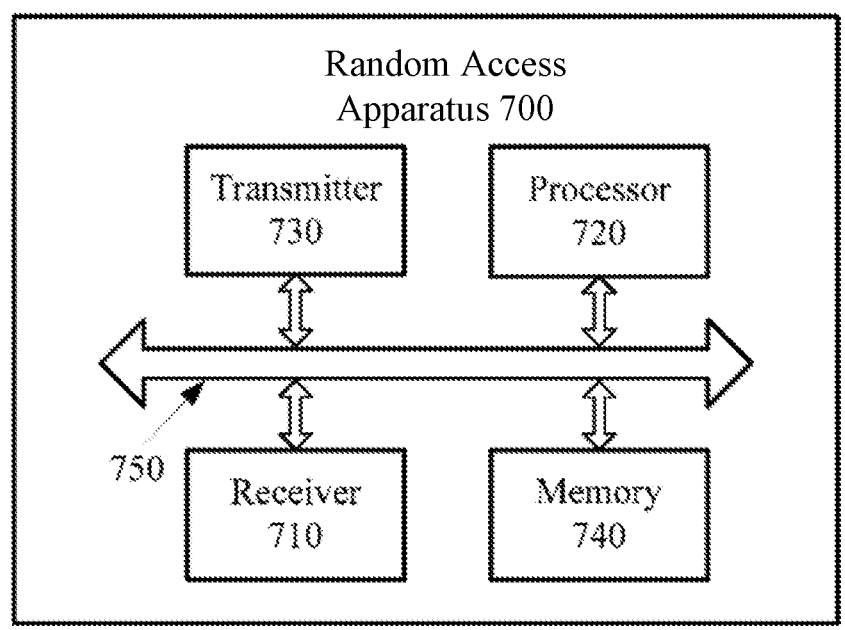
FIG. 8 is a schematic block diagram of another random access apparatus according to an embodiment of the present application.

FIG. 8 shows a random access apparatus 700 according to an embodiment of the present application. The apparatus 700 includes a receiver 710, a processor 720, a transmitter 730, a memory 740, and a bus system 750. The receiver 710, the processor 720, the transmitter 730, and the memory 740 are connected by using the bus system 750. The memory 740 is configured to store an instruction. The processor 720 is configured to execute the instruction stored in the memory 740, to control the receiver 710 to receive a signal and control the transmitter 730 to send an instruction.

The receiver 710 is configured to receive information about a plurality of random access resource groups that is sent by a network device. The plurality of random access resource groups are corresponding to different uplink transmission capabilities. The uplink transmission capability includes at least one of a carrier support capability and an uplink subcarrier transmission bandwidth. The carrier support capability is used to indicate whether multi-carrier transmission is supported.

The processor 720 is configured to determine, from the plurality of random access resource groups, a target random access resource group based on an uplink transmission capability of the apparatus and the information about the plurality of random access resource groups.

The transmitter 730 is configured to send a random access request to the network device by using a random access resource in the target random access resource group. The random access request is used to request to access the network device.

Optionally, the processor 720 is specifically configured to:

determine, from the plurality of random access resource groups, the target random access resource group based on the uplink transmission capability and a coverage level that are of the apparatus and the information about the plurality of random access resource groups.

Optionally, the receiver 710 is further configured to:

when a current uplink resource of the network device is insufficient for the apparatus to use multi-carrier transmission, and the uplink transmission capability of the apparatus indicates that the apparatus is capable of supporting multi-carrier transmission, receive scheduling information sent by the network device, where the scheduling information is used to instruct the apparatus to use single-carrier transmission.

Optionally, the random access resource includes at least one of a random access preamble sequence, a time resource, and a frequency resource.

It should be understood that the apparatus 700 may be specifically the terminal device in the foregoing embodiments, and may be configured to perform steps and/or procedures corresponding to the terminal device in the foregoing method embodiments. Optionally, the memory 740 may include a read-only memory and a random access memory, and provide an instruction and data to the processor. A part of the memory may further include a non-volatile random access memory. For example, the memory may further store device type information. The processor 720 may be configured to execute the instruction stored in the memory. When the processor executes the instruction, the processor may perform the steps and/or the procedures corresponding to the terminal device in the foregoing method embodiments.

It should be understood that in the embodiments of the present application, the processor may be a central processing unit (Central Processing Unit, CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor or the processor may be any conventional processor, or the like.

In an implementation process, steps in the foregoing methods can be implemented by using a hardware integrated logic circuit in the processor, or by using instructions in a form of software. The steps of the method disclosed with reference to the embodiments of the present application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor executes instructions in the memory and completes the steps in the foregoing methods in combination with hardware of the processor. To avoid repetition, details are not described herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment based on functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected based on actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform some or all of the steps of the methods described in the embodiments of the present application. The foregoing storage medium includes any medium that can store program code, such as a USB flash drive, a removable hard disk, a read-only memory (Read-Only Memory, "ROM" for short), a random access memory (Random Access Memory, "RAM" for short), a magnetic disk, or an optical disc.

The foregoing descriptions are merely specific implementations of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

What is claimed is:

1. A random access method, comprising:
receiving, by a terminal device, information about a plurality of random access resource groups from a network device, wherein the plurality of random access resource groups are in one-to-one correspondence with a plurality of different combinations, and each of the plurality of different combinations comprises a uplink transmission capability and a coverage level, the uplink transmission capability comprising a carrier support capability and an uplink subcarrier transmission bandwidth, the carrier support capability indicating whether multi-carrier transmission is supported, and the coverage level indicating channel transmission conditions;
determining, by the terminal device, from the plurality of random access resource groups, based on an uplink transmission capability of the terminal device, the coverage level of the terminal device, and the information about the plurality of random access resource groups, a target random access resource group that matches the uplink transmission capability of the terminal device; and
sending, by the terminal device, a random access request to the network device by using a random access resource in the target random access resource group, wherein the random access request is configured to request to access the network device; and, wherein
the uplink transmission capability of the terminal device indicates that the terminal device is capable of supporting multi-carrier transmission, and the method further comprises:
receiving, by the terminal device, scheduling information from the network device, wherein the scheduling information is configured to instruct the terminal device to perform single-carrier transmission, and the single-carrier transmission is triggered by the network device when a current uplink resource is insufficient for the terminal device to perform multi-carrier transmission.

2. The method according to claim 1, wherein the random access resource comprises at least one of a random access preamble sequence, a time resource, or a frequency resource.

3. A random access apparatus, comprising:
a memory storing instructions; and
a processor coupled to the memory to execute the instructions to:
group available random access resources into a plurality of random access resource groups, wherein the plurality of random access resource groups are in one-to-one correspondence with a plurality of different combinations, and each of the plurality of different combinations comprises a uplink transmission capability and a coverage level, the uplink transmission capability comprising a carrier support capability and an uplink subcarrier transmission bandwidth, the carrier support capability indicating whether multi-carrier transmission is supported, and the coverage level indicating channel transmission conditions;
send information about the plurality of random access resource groups to a terminal device;
receive a random access request from the terminal device, wherein the random access request is configured to request to access the apparatus;
determine a target random access resource group to which a random access resource used for the random access request belongs, wherein the plurality of random access resource groups comprise the target random access resource group; and
determine, based on the target random access resource group, an uplink transmission capability of the terminal device that matches the target random access resource group and, wherein
the uplink transmission capability of the terminal device indicates that the terminal device is capable of supporting multi-carrier transmission, and the method further comprises:
receiving, by the terminal device, scheduling information from the network device, wherein the scheduling information is configured to instruct the terminal device to perform single-carrier transmission, and the single-carrier transmission is triggered by the network device when a current uplink resource is insufficient for the terminal device to perform multi-carrier transmission.

4. The apparatus according to claim 3, wherein the processor coupled to the memory to execute the instructions to:
perform scheduling for the terminal device based on the uplink transmission capability of the terminal device.

5. The apparatus according to claim 4, wherein the processor coupled to the memory to execute the instructions to:
perform scheduling for the terminal device based on the uplink transmission capability of the terminal device and a current uplink resource usage status.

6. The apparatus according to claim 5, wherein the processor coupled to the memory to execute the instructions to:
send scheduling information to the terminal device in a case that a current uplink resource of the apparatus is insufficient for the terminal device to use multi-carrier transmission and the uplink transmission capability of the terminal device indicates that the terminal device is capable of supporting multi-carrier transmission, wherein the scheduling information is used to instruct the terminal device to use single-carrier transmission.

7. The apparatus according to claim 3, wherein the random access resource comprises at least one of a random access preamble sequence, a time resource, or a frequency resource.

8. A random access apparatus, comprising:
a memory storing instructions; and
a processor coupled to the memory to execute the instructions to:

receive information about a plurality of random access resource groups from a network device, wherein the plurality of random access resource groups are in one-to-one correspondence with a plurality of different combinations, and each of the plurality of different combinations comprises a uplink transmission capability and a coverage level, the uplink transmission capability comprising a carrier support capability and an uplink subcarrier transmission bandwidth, the carrier support capability indicating whether multi-carrier transmission is supported, and the coverage level indicating channel transmission conditions;

determine, from the plurality of random access resource groups, based on an uplink transmission capability of the apparatus, the coverage level of apparatus, and the information about the plurality of random access resource groups, a target random access resource group that matches the transmission capability of the apparatus; and send a random access request to the network device by using a random access resource in the target random access resource group, wherein the random access request is used to request to access the network device; and, wherein the uplink transmission capability of the apparatus indicates that the apparatus is capable of supporting multi-carrier transmission, and the receiving unit is further configured to:

receive scheduling information from the network device, wherein the scheduling information is used to instruct the apparatus to perform single-carrier transmission, and the single-carrier transmission is triggered by the network when a current uplink resource is insufficient for the apparatus to perform multi-carrier transmission.

9. The apparatus according to claim 8, wherein the random access resource comprises at least one of a random access preamble sequence, a time resource, or a frequency resource.

* * * * *